US009862380B2

(12) United States Patent
Minoiu Enache

(10) Patent No.: US 9,862,380 B2
(45) Date of Patent: Jan. 9, 2018

(54) METHOD AND DEVICE FOR AUTOMATICALLY CONTROLLING A VEHICLE

(71) Applicant: RENAULT s.a.s., Boulogne-Billancourt (FR)

(72) Inventor: Nicoleta Minoiu Enache, Versailles (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 15/030,495

(22) PCT Filed: Oct. 17, 2014

(86) PCT No.: PCT/EP2014/072356
§ 371 (c)(1),
(2) Date: Apr. 19, 2016

(87) PCT Pub. No.: WO2015/071052
PCT Pub. Date: May 21, 2015

(65) Prior Publication Data
US 2016/0264136 A1 Sep. 15, 2016

(30) Foreign Application Priority Data
Nov. 18, 2013 (FR) ...................................... 13 61245

(51) Int. Cl.
G01C 22/00 (2006.01)
B60W 30/09 (2012.01)
(Continued)

(52) U.S. Cl.
CPC ............ B60W 30/09 (2013.01); B60W 30/02 (2013.01); B60W 30/095 (2013.01);
(Continued)

(58) Field of Classification Search
CPC .... B60W 30/09; B60W 30/02; B60W 30/095; B60W 2520/10; B60W 2520/125;
(Continued)

(56) References Cited

U.S. PATENT DOCUMENTS

2008/0208461 A1* 8/2008 Gharsalli ............... G01C 21/32
701/425
2009/0287376 A1* 11/2009 Aso ....................... B60W 10/12
701/42

(Continued)

OTHER PUBLICATIONS

French Search Report dated Jul. 7, 2014 in French Patent Application 1361245 Filed Nov. 18, 2013.
(Continued)

Primary Examiner — Shardul Patel
(74) Attorney, Agent, or Firm — Oblon, McClelland, Maier & Neustadt, L.L.P.

(57) ABSTRACT

A method for automatically controlling a vehicle includes giving a reference local path and a potential speed of the vehicle. The method also includes calculating a stirring angle automatic setpoint that makes it possible to calculate a lateral acceleration proportional to the square of the potential speed of the vehicle, making the vehicle describe an arc of a circle including a point of intersection with the reference local path at a distance from the vehicle. A speed setpoint is generated and set to a value equal to that of the potential speed when the lateral acceleration has a value lower than a maximum permissible lateral acceleration value and the value of the potential speed is decreased when the lateral acceleration has a value higher than or equal to the maximum permissible lateral acceleration value so as to calculate a reduced lateral acceleration by repeating the calculating.

10 Claims, 6 Drawing Sheets

Figure 1:
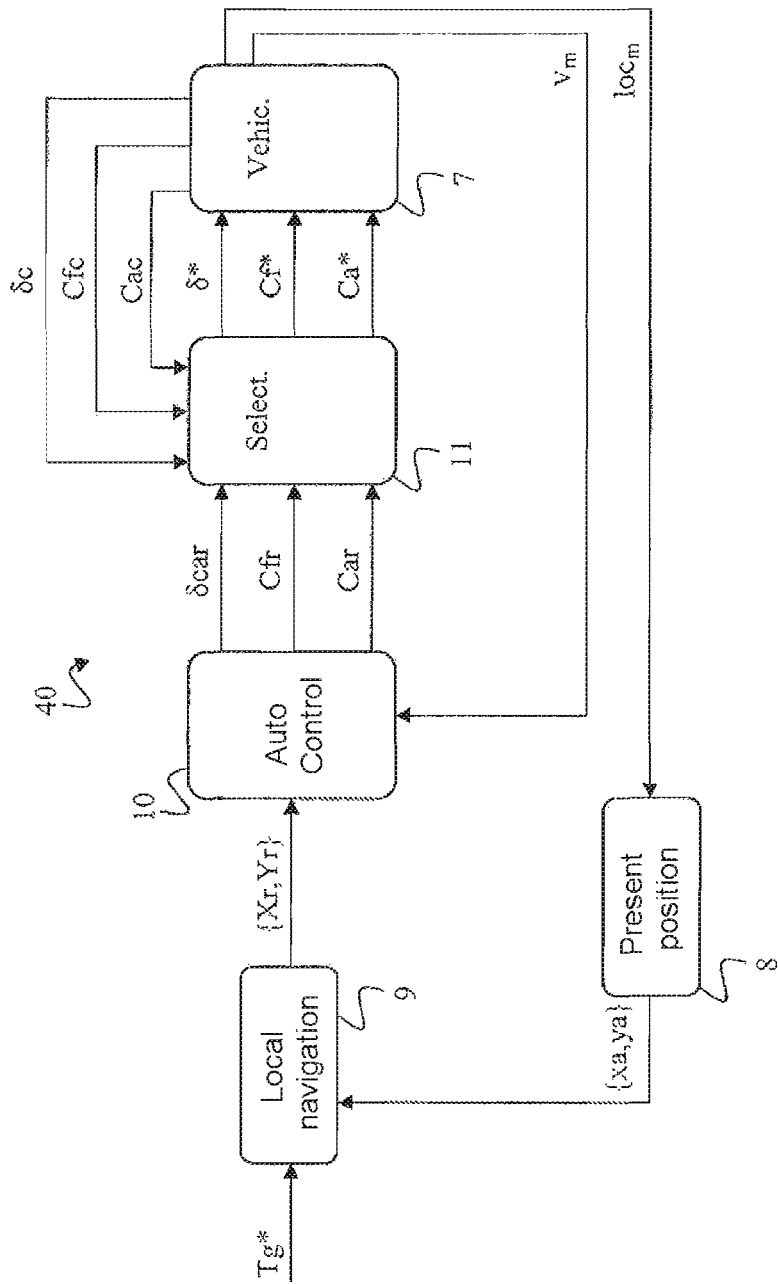

(51) Int. Cl.
*B60W 30/02* (2012.01)
*B60W 30/095* (2012.01)
*G05D 1/00* (2006.01)

(52) U.S. Cl.
CPC ....... *G05D 1/0088* (2013.01); *B60W 2520/10* (2013.01); *B60W 2520/125* (2013.01); *B60W 2710/20* (2013.01); *B60W 2710/207* (2013.01); *B60W 2720/10* (2013.01); *B60W 2720/125* (2013.01)

(58) Field of Classification Search
CPC ....... B60W 2710/20; B60W 2710/207; B60W 2720/10; B60W 2720/125; G05D 1/0088
USPC .............................. 701/23, 41, 42, 301, 425
See application file for complete search history.

(56) References Cited

U.S. PATENT DOCUMENTS

2011/0264328 A1* 10/2011 Brueggemann ....... B60W 10/18
 701/41
2012/0101713 A1* 4/2012 Moshchuk .......... B60W 10/184
 701/301

OTHER PUBLICATIONS

International Search Report dated Jan. 8, 2015 in PCT/EP14/72356 Filed Oct. 17, 2014.

* cited by examiner

METHOD AND DEVICE FOR AUTOMATICALLY CONTROLLING A VEHICLE

The invention concerns a method and a device for automatically controlling a vehicle, notably a motor vehicle. The invention also concerns a vehicle equipped with that device.

There is considerable research regarding automatically controlled ground vehicles because the resulting autonomy of the vehicle enables a user of the vehicle to be relieved of some or all of the driving tasks, which are often tedious, in order to devote themselves to other activities.

For example, the document US2008/0208461 describes a system for regulating the route of construction machinery by generating a trajectory to be followed by the machine, based on a so-called "pure tracking" algorithm that causes the vehicle to describe a circular arc that intersects the trajectory at a certain target distance in front of the vehicle. The system described in the above document, more suitable for construction sites than for roads, does not take account of the comfort requirements expected of a vehicle more oriented toward the transportation of humans, notably in terms of roadholding and physical interaction with passengers, as where lateral acceleration is concerned, for example.

The document US2009/0287376 uses Kalman filtering to take an acceleration measured by a G sensor into account to generate a vehicle turning angle set point. However, the complexity of the device described may give rise to certain drawbacks in terms of cost and ruggedness.

To remedy the drawbacks of the prior art, the invention consists in a method for automatically controlling a vehicle, including:
- an initial step in which are given a reference local trajectory and a potential speed of the vehicle;
- a step of calculating a turning angle automatic set point that causes the vehicle to describe a circular arc including a point of intersection with said reference local trajectory at a target distance from the vehicle, wherein there is calculated a lateral acceleration proportional to the square of the potential speed of the vehicle describing said circular arc;
- a step of comparing said calculated lateral acceleration with a maximum permissible lateral acceleration value;
- a step of generating a speed set point set to a value equal to that of the potential speed when said lateral acceleration has a value lower than said maximum permissible lateral acceleration value;
- an adjustment step wherein the value of the potential speed is reduced if said lateral acceleration has a value greater than or equal to said maximum permissible lateral acceleration value so as to calculate a reduced lateral acceleration by reiteration of said calculation step.

Specifically, in said calculation step the target distance that separates the vehicle from said point of intersection with the trajectory is calculated proportionately to the potential speed of the vehicle.

More specifically, the target distance that separates the vehicle from the point of intersection with the trajectory is calculated in the calculation step by multiplying the potential speed of the vehicle by a variable coefficient increasing when the lateral acceleration has a value greater than or equal to the maximum permissible lateral acceleration value and the absolute value of a distance between the circular arc and the reference local trajectory is less than a maximum permissible distance.

The distance is preferably calculated as equal to the greatest of the measurable distances between a point of the circular arc and a point of the trajectory both located on the same radius of the circular arc.

To be more precise, in a step the maximum permissible distance is calculated equal to an overevaluation of the absolute value of the distance calculated in a previous execution of the calculation step.

The method advantageously includes a step of generating a speed set point set to a value equal to that of the potential speed before reduction when the value of the potential speed after reduction is less than a minimum permissible potential speed value.

The invention also consists in a computer program including program code instructions for the execution of the steps of the method in accordance with the invention when said program is executed on one or more computers.

The invention further consists in a device for automatically controlling a vehicle, including an automatic control module receiving as input a reference local trajectory descriptor, said module holding in memory a computer program in accordance with the invention for generating a turning angle automatic set point so as to maintain a calculated lateral acceleration short of a maximum permissible lateral acceleration value.

Specifically, the automatic control device in accordance with the invention receives as input measured speed feedback so as to generate a braking and/or acceleration torque automatic set point to maintain the lateral acceleration short of a maximum permissible lateral acceleration value.

The invention finally consists in a motor vehicle including an automatic control device in accordance with the invention in order to operate in autonomous mode.

Figure 2:
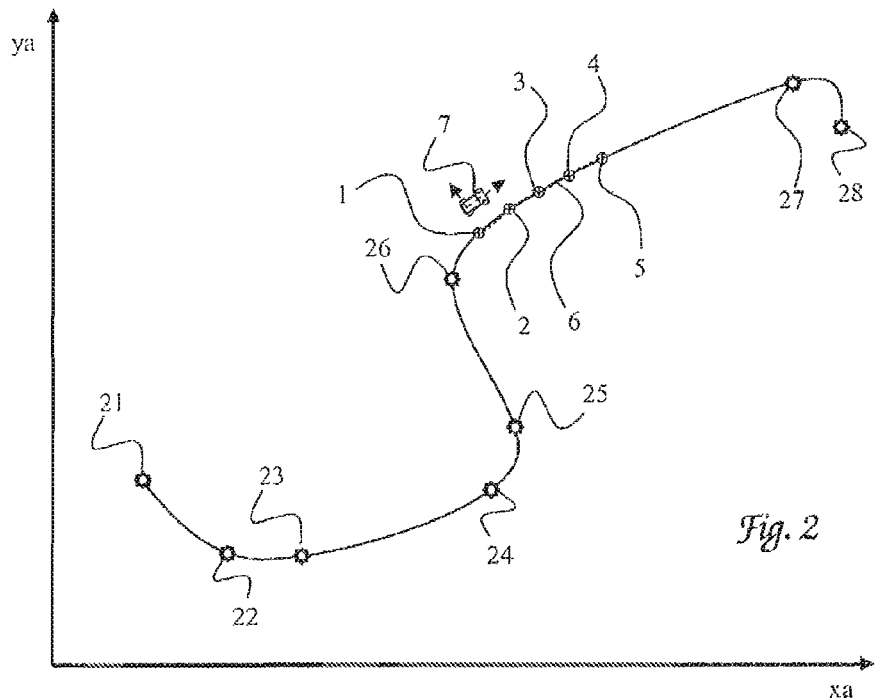
Figure 3:
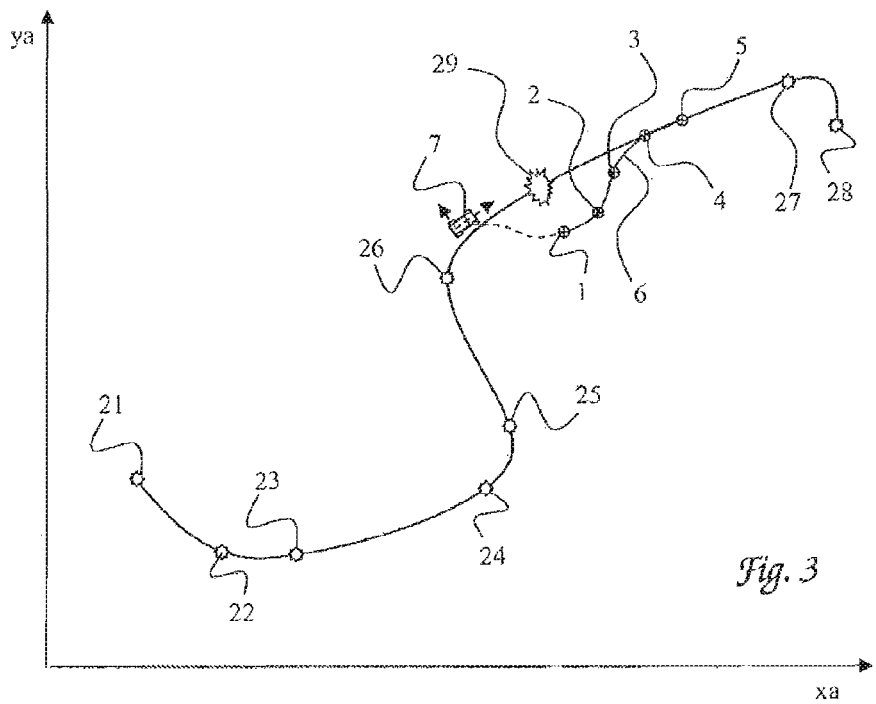
Figure 4:
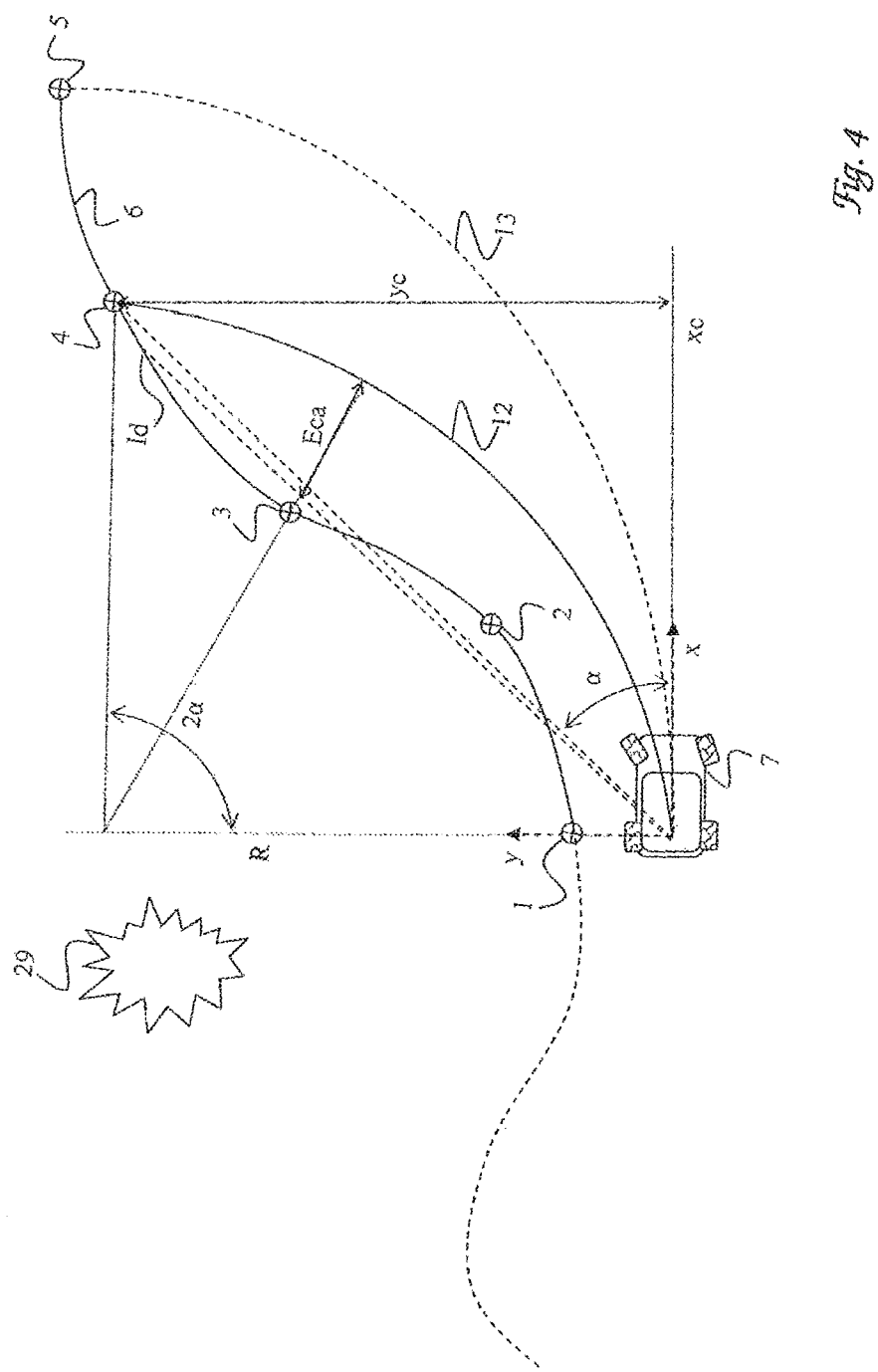
Figure 5:
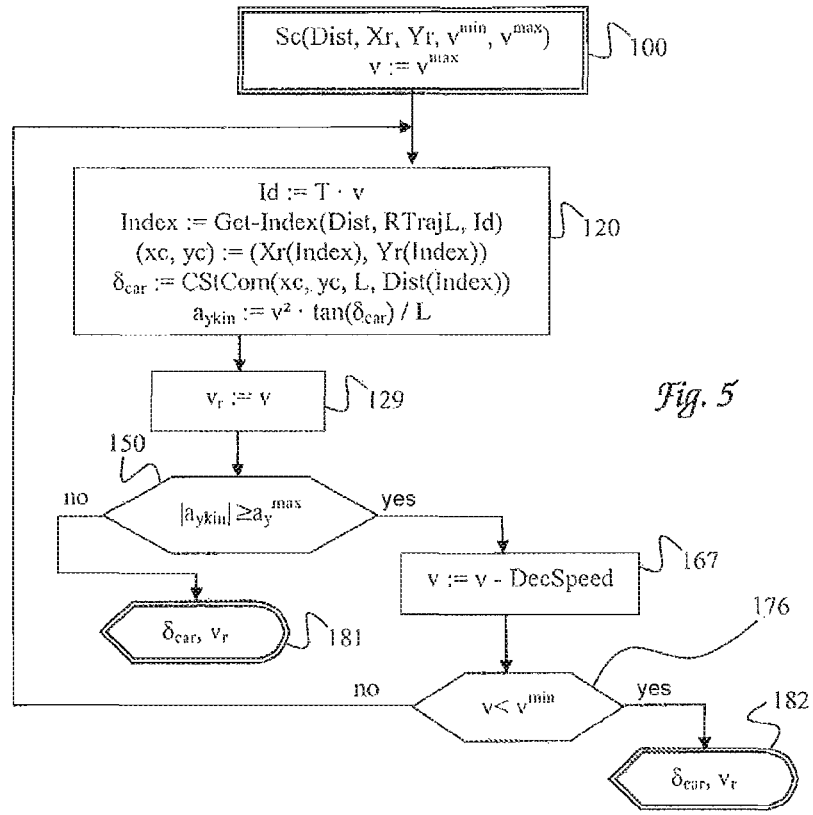
Figure 6:
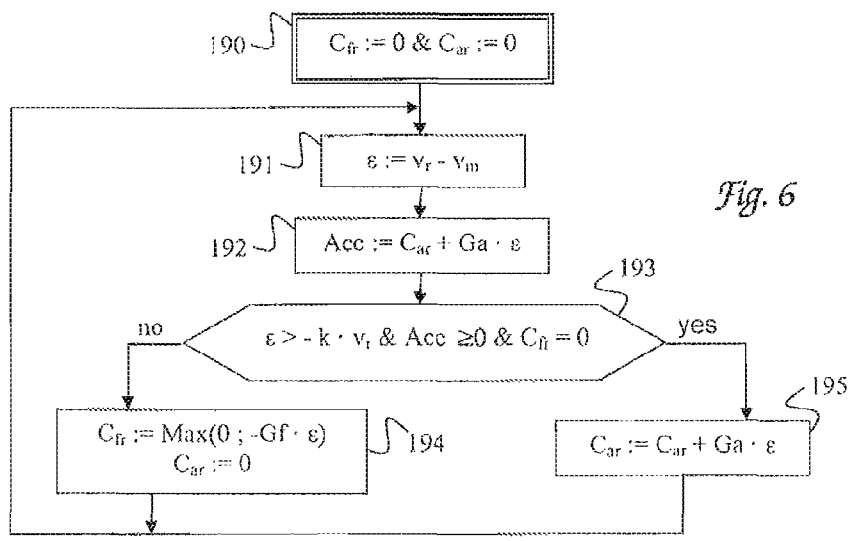
Figure 5A:
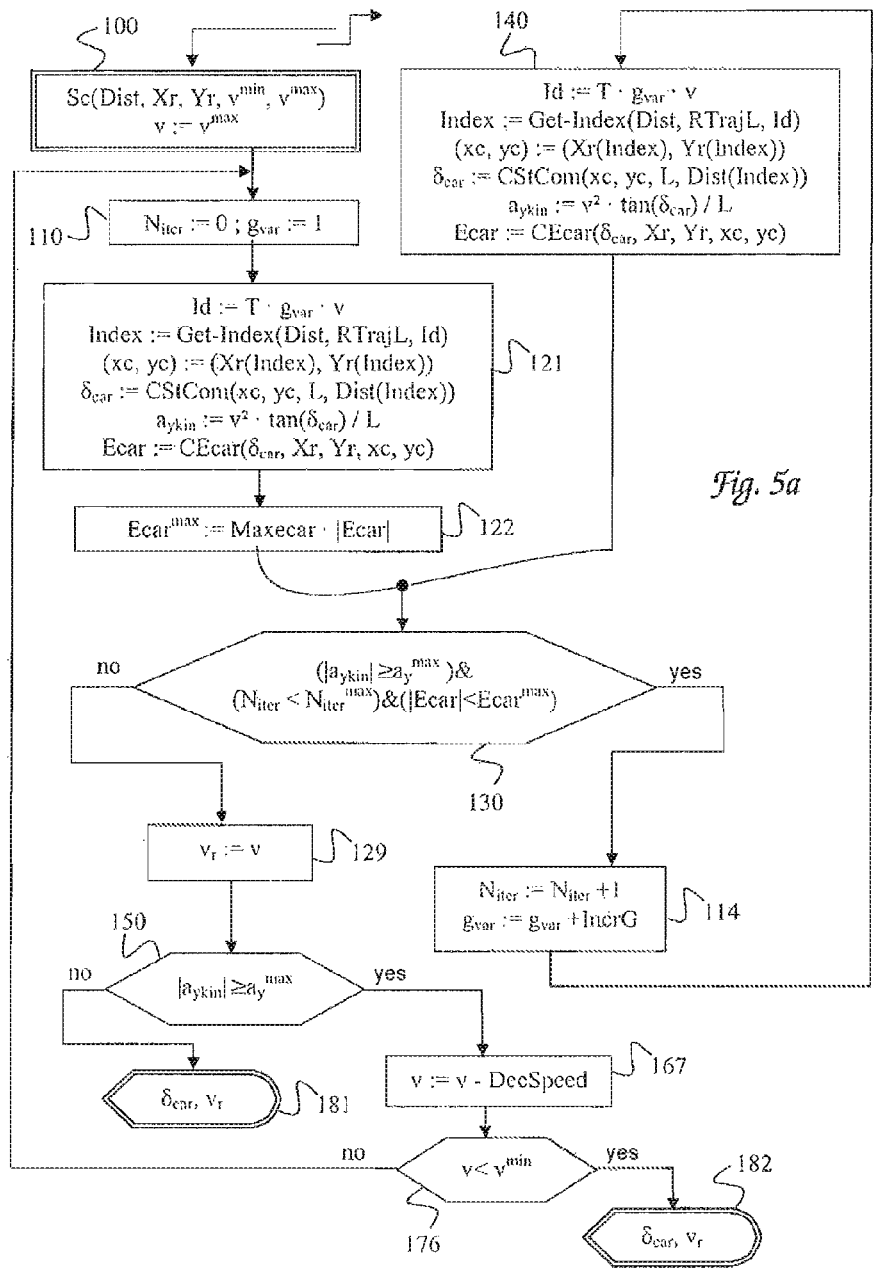
Figure 5B:
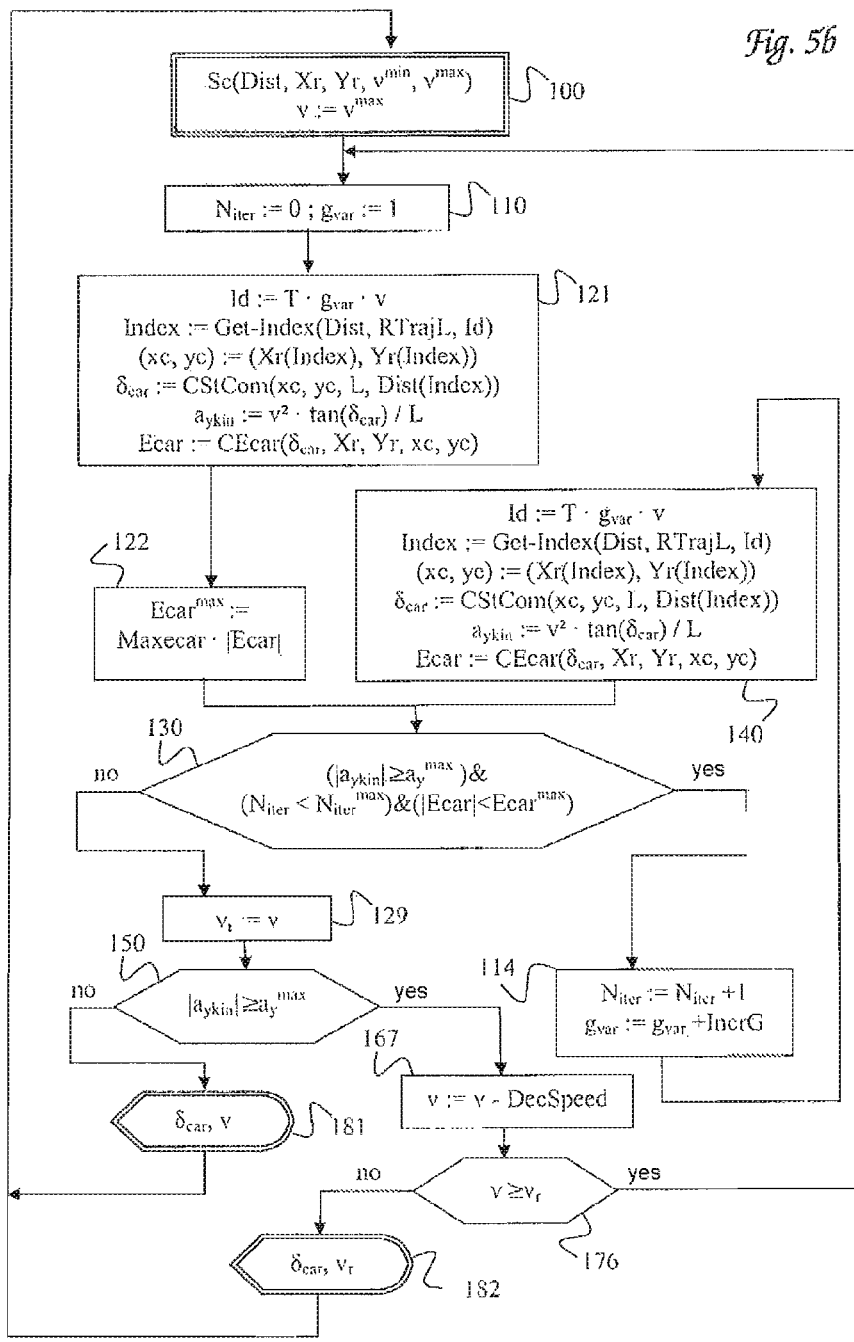

Other features and advantages will become apparent on reading the following description with reference to the appended drawings, in which:

FIG. 1 represents a diagram of a vehicle control device in accordance with the invention, FIGS. 2 and 3 represent possible vehicle trajectories, FIG. 4 is a diagram for explaining the physical parameters taken into account by a method in accordance with the invention, FIGS. 5, 5a and 5b show steps of the method in accordance with the invention, FIG. 6 shows additional steps of the method in accordance with the invention.

FIG. 1 shows a device 40 that supplies to a vehicle 7 set points for the turning angle $\delta^*$, the braking torque $Cf^*$ and the acceleration torque $Ca^*$ distributed to wheels of the vehicle 7 so as to be able to control the trajectory thereof automatically.

The turning angle makes it possible to change the direction of the vehicle but is not always sufficient in itself to maintain the vehicle on or to return it to a trajectory to be followed. Judiciously applied accelerations and decelerations can sometimes be useful.

For example, a positive acceleration torque $Ca^*$ set point makes it possible to accelerate a vehicle equipped with an internal combustion engine by increasing its engine speed. A positive braking torque $Cf^*$ set point makes it possible to decelerate the vehicle by exerting a proportional pressure on dissipative brakes that is generally conjugate with a reduced speed of the internal combustion engine slaved to a null acceleration torque $Ca^*$ set point.

As another example, a positive acceleration torque $Ca^*$ set point makes it possible to accelerate a vehicle equipped with an electric traction motor by supplying the motor with a positive electrical current. A positive braking torque Cf* set point makes it possible to decelerate the vehicle by supplying the motor with a negative electrical current, i.e. by regenerative braking that can be reinforced by exerting a proportional pressure on the dissipative brakes.

The device 40 includes an automatic control module 10 that generates automatic set points for the turning angle δcar, the braking torque Cfr and the acceleration torque Car.

Although represented in FIG. 1 as outside the vehicle 7 to facilitate its description, it will be clear that the device 40 is at least partly or even totally installed in the vehicle 7.

For example, the module 10 employs a microprocessor, a memory and input-output interfaces (not shown) of a real-time computer onboard the vehicle 7. The input-output interfaces enable in the conventional manner the module 10 to communicate with other local computers on the vehicle 7 and/or with units of the vehicle via cable connections or via a communication bus conforming to one of the automotive standards such as for example a CAN network, a motor vehicle Ethernet network, etc. The memory can hold calibration values for adapting the device 40 to the type of vehicle 7, for example its length L between the center of a front wheel and the hub center of a rear wheel. The memory can also contain a computer program including program code instructions for the execution of method steps described in the remainder of the description when the program is executed on a computer, notably by the microprocessor referred to above.

If it is intended that the vehicle 7 operate at all times in autonomous mode or in remote-controlled mode, each of which modes is one possible mode of automatic operation of the vehicle, the set points supplied to the vehicle 7 for the turning angle δ*, the braking torque Cf* and the acceleration torque Ca* are directly equal to the automatic set points generated by the automatic control module 10 for the turning angle δcar, the braking torque Cfr and the acceleration torque Car, respectively.

If it is intended that the vehicle 7 operate at will either in automatic mode or in manual mode, the automatic set points generated by the automatic control module 10 for the turning angle δcar, the braking torque Cfr and the acceleration torque Car are transmitted to a mode selection module 11 that also receives manual set points for the turning angle δc, the braking torque Cf and the acceleration torque Ca coming from a steering wheel, a brake pedal and an accelerator pedal, respectively (not shown), actuated in the manner known in itself by a human driver of the vehicle 7.

In the dual mode operation vehicle option, the selection module 11 is installed in a real-time computer, for example, or on an electronic circuit card of the vehicle 7. By executing digital commands received via bus or cable from the human driver or another computer, in manual mode the selection module 11 switches the set points supplied to the vehicle 7 for the turning angle δ*, the braking torque Cf* and the acceleration torque Ca* to the manual set points for the turning angle δc, the braking torque Cfc and the acceleration torque Cac, respectively, and alternatively, in automatic mode, to the automatic set points received from the module 10 for the turning angle δcar, the braking torque Cfr and the acceleration torque Car, in a similar manner to the system described in the international patent application WO2013/150224, for example.

A present position module 8 supplies in real time position coordinates xa, ya in an absolute frame of reference like that shown in FIGS. 2 and 3. The absolute coordinates are generated in various known ways from local information $loc_m$, for example of satellite geolocation type, notably when the vehicle is moving in the open air, of odometer type, notably when the vehicle is moving in a tunnel or in an underground parking lot, or even of inertial center type if a particular requirement justifies it. The absolute coordinates can also be generated in various known manners on the basis of remote information, for example radar detection information from a control tower, video surveillance system information on a protected site or triangulation information employing mobile telecommunication base stations.

A local navigation module 9 receives on the one hand the absolute coordinates xa, ya of the vehicle 7 from the module 8 and on the other hand a reference global trajectory descriptor Tg* going from a departure point 21 to an arrival point 28 according to an itinerary passing through singular points 22, 23, 24, 25, 26, 27 marked on a map expressed in the same frame of reference as the absolute coordinates xa, ya of the vehicle 7. The singular points can give positions of roundabouts, bends, entries into limited speed areas, etc. such as may generally be found on road maps or plans of private sites.

The module 9 generates at regular times a reference local trajectory {Xr, Yr} that starts from the vehicle and terminates at a certain distance in front of the vehicle so as in the long term to follow as closely as possible the reference global trajectory Tg*.

The reference local trajectory {Xr, Yr} expressed in a relative frame of reference x, y tied to the vehicle is moreover calculated in a known manner outside the scope of the invention (see document WO2013/087514 etc.).

The reference local trajectory marked 6 in FIGS. 2 to 4 includes a given number RTajL of discrete points 1, 2, 3, 4, 5 with respective ordinates y1=0, y2, y3, y4, y5 measured parallel to the rear axle of the vehicle 7 from its center and respective abscissae x1, x2, x3, x4, x5 measured from the middle of the rear axle of the vehicle 7 along an axis that joins the middle of the rear axle to the middle of the front axle of the vehicle 7. The abscissae and the ordinates of the discrete points that are not references but values are not shown in the figures so as not to overload the drawings unnecessarily.

In FIG. 2, the reference local trajectory marked 6 is superimposed on a section of the reference global trajectory Tg* in front of the vehicle, which is the most general case. The calculation of the absolute coordinates of the points 1 to 5 simply consists in discretizing the global trajectory portion in front of the vehicle. The calculation of the relative coordinates of the points 1 to 5 simply consists in calculating a change of Cartesian frame of reference as widely taught in schools in the technical field concerned.

In FIG. 3, the reference local trajectory marked 6 deviates from the reference global trajectory Tg* in front of the vehicle, as for example in the case of avoiding an obstacle 29 detected by one or more sensors installed on the vehicle 7 or permanently installed along the route, such as video cameras, for example. As the sensors are not necessarily able to capture the state of the route on the reference global trajectory on the downstream side of the obstacle 29, it is not necessarily calculated in full at detection time. The dashed-line portion corresponds to a trajectory portion 6 that starts at the moment the vehicle 7 begins to depart from the global trajectory in order to avoid the obstacle 29. The points 1 to 5 belong to the trajectory 6 as calculated at the moment the vehicle passes the obstacle 29, as represented on a larger scale in FIG. 4.

Other situations may correspond to a local trajectory significantly departing from the global trajectory section in front of the vehicle, for example if the global trajectory marked on a map is not perfectly superimposed on a mid-line of the traffic lane, for example following a recent modification of the road surface. Vehicle sensors adapted to detect markings on the ground then make it possible, in conjunction with the local navigation module 9, to modify the local trajectory to make it coincide with the mid-line of the traffic lane assigned to the vehicle.

The automatic control module 10 executes a method the essential steps of which in various possible embodiments are explained next with reference to FIGS. 5, 5a, 5b and 6.

The method described below makes it possible to make the vehicle 7 follow the reference local trajectory 6 by generating an automatic set point for the turning angle δcar and an automatic set point for the speed vr from which it is possible to generate automatic set points for the braking torque Cfr and the acceleration torque Car.

The automatic set point for the turning angle δcar is calculated in a step 120 as a function of on the one hand the length L between the center of the front wheel axle and the center of the rear wheel axle and on the other hand a target distance Id that separates the center of the rear wheel axle from a point 4 at the intersection of the local trajectory 6 and a circular arc 12 that the vehicle 7 follows when the turning angle δcar is applied to its steered wheels, as represented in FIG. 4.

The target distance Id is calculated in the step 120 as equal to the product of a potential speed v of the vehicle by a predetermined constant T. It is seen that the constant T is homogeneous with a time that represents a time period necessary for the vehicle 7 to rejoin the local trajectory 6 by following the chord of the circular arc 12 referred to above. The value of the constant T is not very far removed from an actual time period necessary for the vehicle 7 to reach the point 4 on the trajectory if the length of the circular arc 12 is small compared to its radius of curvature R. It is clear that if the value of the constant T is too great, the vehicle will tend to remain off the trajectory for too long before rejoining it and that too low a value is a source of instability. The value of the constant T is therefore determined during development of the vehicle, for example by seeking through trial and error to reduce the constant T to the limit at which the instabilities appear and then to increase it slightly again with a safety margin before it is stored in the memory of the control electronics of the vehicle. There is no universal value of the constant T, which is linked to the morphology of the vehicle and can therefore differ from one vehicle to another.

The potential speed v is initialized in a step 100 to a maximum possible speed value $v^{max}$. The maximum possible speed value $v^{max}$ may result from a speed limit on the road section the vehicle is traveling on, a speed set point imposed by the user of the vehicle, a rule in respect of the spacing from a preceding vehicle traveling at a speed comparable to the maximum possible speed value $v^{max}$, or other traffic conditions in respect of the vehicle. The maximum possible speed value $v^{max}$ and a minimum possible speed value $v^{min}$ are preferably scrutinized periodically in the step 100 so as to take account of changing traffic conditions in respect of the vehicle. The minimum possible speed value $v^{min}$ can result from a legal constraint on the road section the vehicle is traveling on, a minimum speed set point imposed by the user of the vehicle, a maximum longitudinal deceleration acceptable for consistency with passenger comfort, an arrival time compliance regulation, or other traffic conditions in respect of the vehicle.

The automatic set point for the turning angle δcar is calculated in the step 120 by executing the algorithm explained next.

The relative coordinates xc, yc of the point 4 of intersection in the local frame of reference tied to the vehicle are determined as being those of the point on the local trajectory 6 that best satisfies the target distance condition Id.

The local trajectory 6 is given in the step 100 in the form of a continuous Cartesian function or in the form of a discrete set of points with coordinates specified by vectors Xr, Yr.

If there is a point on the local trajectory 6 with coordinates that satisfy the equation:

$$\sqrt{xc^2+yc^2}=Id \qquad \text{(i)}$$

that point is selected.

Such a point does not necessarily exist, notably if the local trajectory 6 is expressed in a discrete manner by a pair of vectors Xr, Yr defining a discrete number RTrajL of points 1, 2, 3, 4, 5 with relative coordinates xr, yr in the frame of reference tied to the vehicle.

In this particular situation an elegant way to obtain the coordinates xc, yc of the intersection point 4 is to generate a vector Dist with a cardinal dimension RTrajL equal to that of the vectors Xr, Yr and each coordinate Ir of which associated with a point 1, 2, 3, 4, 5 of the trajectory 6 is given by the formula:

$$Ir:=\sqrt{xr^2+yr^2} \qquad \text{(ii)}$$

It is possible to calculate the vector Dist in the step 100.

For example, the step 120 then includes the execution of a Get-Index subroutine to obtain the Index value for the rank of the coordinate Ir of the vector Dist, which is the value closest to that of the target distance Id.

For example, one simple way to implement the Get-Index subroutine is to program instructions consisting in scanning the coordinates ir of the vector Dist and selecting the greatest Index value Iri that is less than Id. If the number of values less than Id is less than RTrajL, instructions select the lowest value Irs that is greater than Id after which other instructions substitute the lowest Index value Irs for the highest Index value Iri if the lowest value Irs is closer to that of the target distance Id than the highest value Iri.

The point 4 selected is then that for which the relative coordinates xc, yc are respectively equal to the coordinates Xr(index), Yr(Index) of rank Index in the vectors Xr, Yr.

The target distance Dist(Index) on the target axis of the point 4 from the center of the rear axle of the vehicle 7 may then be significantly less than or significantly greater than the intended target distance Id.

An angle α between the target axis of the point 4 and the median axis of the vehicle has the sine value sin α given by the formula:

$$\sin \alpha = Yr(\text{Index})/\text{Dist}(\text{Index}) \qquad \text{(iii)}$$

When the vehicle 7 follows the circular arc 12, its median axis is at all times tangential to the circular arc 12. Basic geometry indicates that the angle at the center of the circular arc 12 is equal to twice the angle α.

For example, the automatic set point for the turning angle δcar is calculated in the step 120 by means of a subroutine CStCom that uses the formula:

$$\delta car := \text{sat}(\text{Arctan}(2 \cdot L \cdot Yr(\text{Index})/\text{Dist}^2(\text{Index})), \delta max) \qquad \text{(iv)}$$

The above formula expresses the fact that the automatic set point for the turning angle δcar is equal to the first term of a saturation function limited to a range of values between two bounds of opposite sign equal in absolute value to a maximum permissible turning angle δmax by the vehicle.

A potential lateral acceleration $a_{ykin}$ is also calculated in the step 120 as a function of on the one hand the length L between the center of the front wheel axle and the center of the rear wheel axle and on the other hand the potential speed v and the automatic set point for the turning angle δcar by means of the following formula:

$$a_{ykin} := v^2 \cdot \tan(\delta car)/L \qquad (v)$$

In the particular case referred to above in which the local trajectory 6 is specified discretely, the potential lateral acceleration $a_{ykin}$ can also be calculated by means of the following formula:

$$a_{ykin} := \text{sat}(2 \cdot v^2 \cdot Yr(\text{Index})/\text{Dist}^2(\text{Index}), \tan(\delta max)) \qquad (vi)$$

$$a_{ykin} \approx \text{sat}(2 \cdot Yr(\text{Index})/T^2, \tan(\delta max)) \qquad (vii)$$

The automatic set point for the speed $v_r$ is set in a step 129 to a value equal to that of the potential speed value v used in the step 120.

A test step 150 detects if the absolute value of the potential lateral acceleration $a_{ykin}$ exceeds a maximum permissible lateral acceleration value $a_y^{max}$. The maximum permissible lateral acceleration value $a_y^{max}$ is predetermined as a function of various criteria such as the adhesion of the wheels to the road surface, a threshold that is clinically tolerable for a human, a more sporting or more comfortable driving mode or other criteria.

The value generally recognized as the passenger comfort threshold is 0.4 g, in other words slightly less than half the terrestrial acceleration g=9.881 m/s². More generally, the vehicle must exhibit a behavior that does not scare pedestrians either. On the other hand, the combination of the lateral acceleration and the longitudinal acceleration must not exceed the friction ellipse specific to the vehicle concerned. If heavy braking or heavy acceleration is required, the lateral acceleration must be further reduced.

A step 181 is activated if the absolute value of the potential lateral acceleration $a_{ykin}$ does not exceed the maximum permissible lateral acceleration value $a_y^{max}$. The automatic set points for the turning angle δcar and the speed vr are then respectively taken as equal to that calculated in the immediately preceding execution of the step 120 and that set in the immediately preceding execution of the step 129.

An adjustment step 167 is activated if the absolute value of the potential lateral acceleration $a_{ykin}$ exceeds the maximum permissible lateral acceleration value $a_y^{max}$ so as to reduce the potential speed value v, for example by subtracting a preset value DecSpeed.

The value DecSpeed may be fixed, for example of the order of 0.5 m/s, or set at a percentage, for example of the order of 5% of the current speed. The value DecSpeed may also be obtained from maps as a function of the speed and the maximum permitted lateral acceleration of the vehicle.

Means other than subtracting a preset value may be used to reduce the potential speed value v, such as multiplying the potential speed value by a coefficient less than one, for example.

Following the step 167, a test step 176 detects if the new potential speed value v reduced in this way is below the minimum possible speed value $v^{min}$.

A step 182 is activated if the reduced potential speed value v is less than the minimum possible speed value $v^{min}$. The automatic set points for the turning angle δcar and the speed vr are then respectively taken as equal to that calculated in the immediately preceding execution of the step 120 and that set in the immediately preceding execution of the step 129.

The step 120 and the subsequent steps are reactivated if the reduced potential speed value v is not less than the minimum possible speed value $V^{min}$.

In the embodiment that has just been described with reference to FIG. 5, the new potential speed value v reduced in this way in the step 167 has the effect of reducing the target distance Id when the step 120 is executed again and consequently of generally reducing the distance that separates the point of intersection of the circular arc 12 with the local trajectory 6. With a fixed value of the constant T, there may be observed a reduction of the lateral acceleration substantially proportional to the potential speed reduction as indicated by the above formula (vii). This can be explained by the fact that here the effect of reducing the speed is to tend to increase the turning angle to return to the trajectory at the end of a time period defined by the constant T.

The embodiment described next with reference to FIG. 5a includes the steps 100, 129, 150, 167, 176, 181, 182 of the FIG. 5 embodiment.

The step 120 from FIG. 5 is replaced by a step 121 in which the automatic set point for the turning angle δcar is calculated, as in the step 120, as a function of on the one hand the length L between the center of the front wheel axle and the center of the rear wheel axle and on the other hand a target distance Id that separates the center of the rear wheel axle from the point 4 at the intersection of the local trajectory 6 and the circular arc 12 that the vehicle 7 is following when the turning angle δcar is applied to its steered wheels, as represented in FIG. 4.

The target distance Id that is calculated in the step 121 is equal to the product of the potential speed v of the vehicle by the predetermined constant T and by a variable gain $g_{var}$. The variable gain $g_{var}$ is initialized to a unit value in a step 110 that precedes the step 121 so that the target distance Id that is calculated on each first execution of the step 121 following an execution of the step 110 is identical to that calculated in the step 120 of the previous embodiment.

The potential lateral acceleration $a_{ykin}$ is calculated in the step 121 in exactly the same manner as in the step 120.

The step 121 further consists in calculating a maximum distance value Ecar between the local trajectory 6 and the circular arc 12.

The maximum distance value Ecar is calculated by means of a subroutine CEcar, for example, taking as argument the turning angle δcar, the reference local trajectory {Xr, Yr} and the coordinates xc, yc of the target point 4 of the local trajectory.

The turning angle δcar gives the radius of curvature R from the formula:

$$R := L/\tan(\delta car) \qquad (viii)$$

The reference local trajectory {Xr, Yr} gives the coordinates xri, yri of a point of increasing index i of the local trajectory for calculating a distance di of the point concerned relative to the center of the circle passing through the circular arc 12 using the formula:

$$di := \sqrt{(R-yri)^2 + xri^2} \qquad (ix)$$

The distance di enables calculation of a distance Ecari between the point with index i of the local trajectory and the nearest point of the circular arc 12 using the formula:

$$Ecari := R - di \qquad (x)$$

The coordinates xc, yc of the target point 4 of the local trajectory enable stopping calculation of the distance Ecari for the index i of the target point.

The subroutine CEcar then returns a value Ecar of the maximum observable distance from the trajectory that corresponds to the greatest of the calculated distance values Ecari.

A step 122 is executed after the step 121 to set a maximum permissible distance variable $Ecar^{max}$ to a value equal to the maximum observable distance value Ecar calculated in the step 121 multiplied by a coefficient Maxecar having a value greater than unity. By way of purely illustrative and non-limiting example, values may be chosen for the coefficient Maxecar in a range of values varying from 1.05 to 2, in other words in a range of values varying from a value close to unity to substantially twice that value. If Ecart is low, double its value may be employed. The value of Maxecart then also depends on the value of Ecart.

A step 130 is executed before the step 129 described above with reference to FIG. 5. In a variant embodiment, the step 129 may also be executed directly after the step 122 before a first execution of the step 130.

The step 130 is a step of verification of a set of conditions including that whereby the absolute value of the potential lateral acceleration $a_{ykin}$ exceeds the maximum permissible lateral acceleration value $a_y^{max}$ and at least the condition whereby the maximum observable distance value Ecar is less than the maximum permissible distance value $Ecar^{max}$.

The step 150 is activated after the step 129 as soon as a condition fails verification in the step 130.

A step 114 is activated when all the conditions are verified in the step 130.

The step 114 mainly increases the variable gain $g_{var}$, for example by adding to it an increment IncrG of (for example but not necessarily) constant value between 0.1 and 0.9.

The new variable gain value $g_{var}$ is used in a step 140 similar to the step 121 but consequently executed with a greater value of the target distance Id than in the step 121. The effect of this is to increase the radius of curvature and consequently to reduce the automatic set point value for the turning angle δcar recalculated in the step 140. Increasing the radius of curvature also has the effect of reducing the radial acceleration $a_{ykin}$. Depending on the nature of the trajectory, this can have the effect of increasing the maximum observable distance value Ecar that it is important to control in a re-execution of the step 130 by comparing to the maximum permissible distance variable $Ecar^{max}$ set in the step 122 the new maximum observable distance value Ecar calculated in the step 140. The steps 114 and 140 therefore loop to the step 130 if the radial acceleration $a_{ykin}$ is greater than or equal to the maximum permissible lateral acceleration value $a_y^{max}$ and the maximum observable distance value Ecar does not exceed the maximum distance value Ecar initially observable for the shortest target distance Id calculated in the step 121.

The steps 114 and 140 therefore make it possible to reduce the radial acceleration $a_{ykin}$ by increasing the target distance Id so as to maintain the speed v constant. Maintaining the speed, if possible, has the advantage of increased driving comfort through reducing the longitudinal decelerations and reducing increased travel times. Note however that the nature of the trajectory represented in FIG. 3 induces an increase in the distance Eca between the point 3 on the trajectory and the circular arc 13 when the new target point is the point 13. The condition of the step 130 that bears on the verification of the maximum observable distance value Ecar has the object of preventing the vehicle from departing too far from its reference trajectory before rejoining it and therefore preventing the possible risks of leaving the road, collision etc.

On the other hand, other kinds of trajectory may not induce any trajectory distance increase or induce only very slight increases, as is the case on a straight line reference trajectory, for example.

An additional condition of the step 130 that bears on a maximum number of iterations $N_{iter}^{max}$ of the steps 114 and 140 makes it possible to limit the calculation time it must be remembered that the calculation is carried out in real time) by avoiding excessive repetition of the activation of the steps 114 and 140. The maximum number of iterations $N_{iter}^{max}$ is for example set in EEPROM during development studies taking account of sensor sampling cycles and the computing power of the computers to generate turning angle and speed references in two successive sampling operations. The maximum number of iterations $N_{iter}^{max}$ can also be set in EEPROM during development studies so it does not exceed a certain value, for example, here determined during testing of a pre-production vehicle to obtain a behavior that would appear to be the most comfortable for the test driver or even a passenger.

In this case, a number of iterations $N_{iter}$ increased by one unit on each activation of the step 114 is initialized to zero in the step 110. The step 130 then consists moreover in verifying that the present number of iterations $N_{iter}$ is less than the maximum number of iterations $N_{iter}^{max}$.

Other conditions may be envisaged in addition to or instead of that referred to in the previous paragraph, for example a condition bearing on a maximum target distance Id, etc.

It is necessary to activate the step 140 to reduce the potential lateral acceleration $a_{ykin}$ when it is not less than the maximum permissible lateral acceleration value $a_y^{max}$. However, ever, it may be necessary not to activate the step 140 despite the fact that the potential lateral acceleration $a_{ykin}$ is greater than or equal to the maximum permissible lateral acceleration value $a_y^{max}$. This is notably the case if the maximum observable distance Ecar is too large (see above).

This is why the step 150 verifies if the potential lateral acceleration $a_{ykin}$ is greater than or equal to the maximum permissible lateral acceleration value $a_y^{max}$ despite the verification of the step 130 leading to non-execution or stopping of execution of the steps 114 and 140.

Starting from the step 150, the method continues through some or all of the steps 181, 167, 176, 182 in an identical manner to that described with reference to FIG. 5. In particular, the method loops to the step 121 as long as the potential lateral acceleration $a_{ykin}$ is greater than or equal to the maximum permissible lateral acceleration value $a_y^{max}$ and the potential speed v of the vehicle after being decremented is not less than the minimum speed $v_{min}$.

The method may loop directly to the step 121 on the downstream side of the step 110 to preserve the latest variable gain value obtained in the step 114 so as to save calculation time by economizing on activation of the steps 114 and 140.

By looping upstream of the step 110, the method reinitializes to unity the value of the variable gain $g_{var}$ and thus provides the possibility of obtaining a target distance shorter than that obtained after the latest execution of the step 140 if the use in the step 121 of the reduced value of the potential speed v leads to this.

The steps of the embodiment of the method that have just been described with reference to FIG. 5a therefore enable a balance to be achieved between reducing speed and increasing target distance with the aim of optimizing passenger comfort through lateral acceleration that is as far as possible less than a maximum permissible value.

The FIG. 5b embodiment is similar to the FIG. 5a embodiment. In simple terms, in the FIG. 5a method, the step 100 and the other steps following it are activated regularly on each clock pulse, for example every 20 ms. In the FIG. 5b method, the step 100 and the other steps following it are activated continuously after each activation of one of the steps 181 or 182.

Each of the steps 181 or 182 executed in the automatic control module 10 therefore enables direct generation of the automatic set point for the turning angle δcar and indirect generation of the set points for the braking torque Cfr and the acceleration torque Car.

FIG. 6 shows one possible use of the speed reference $v_r$ obtained in one of the steps 181 or 182 for generating the set points for the braking torque Cfr and the acceleration torque Car.

When the vehicle 7 is started, the set points for the braking torque Cfr and the acceleration torque Car are initialized to a null value in a step 190 on starting the engine of the vehicle.

An error ϵ between the speed reference $v_r$ and a measured speed $v_m$ of the vehicle 7 is calculated in a step 191.

The error ϵ (to within one multiplier coefficient) is added to the current value of the acceleration torque reference Car in a step 192 to obtain a torque requirement Acc.

A test step 193 verifies a set of conditions to determine whether the acceleration torque Car or the braking torque Cfr is suitable for best meeting the torque requirement Acc obtained in the step 192 so as to activate a step 194 if it is the braking torque Cfr that is determined to be suitable and to activate a step 195 if it is the acceleration torque Car that is determined to be suitable.

A first condition for activating the step 195 is verified positive if the torque requirement Acc is greater than or equal to zero, which corresponds to a requirement to overcome or to compensate dynamic and dissipative forces to accelerate the vehicle, maintain its speed, or decelerate it moderately, for example to lock onto a lower speed reference.

A second condition for activating the step 195 is verified positive if the set point for the braking torque Cfr is null.

Conditions other than those described above may be verified in the step 193, for example that relating to a speed error ϵ less than a negative threshold that immediately activates the step 194 even if the torque requirement Acc is greater than or equal to zero. This condition remedies the drawbacks of the generally non-null response time of the total regulation implemented in the step 195.

If all the conditions of the step 193 are verified positive, the step 195 is activated to implement a total torque regulation with the aim of operating with a null speed error ϵ.

In the step 195, the speed error ϵ is multiplied by an integral acceleration gain Ga the product of which is added to a previous value of the set point for the acceleration torque Car to obtain a new set point value for the acceleration torque Car.

As soon as one of the conditions of the step 193 is verified negative, the step 194 is activated to implement saturated proportional torque regulation with the aim of operating with a short delay.

In the step 194, the speed error ϵ is multiplied by a proportional braking gain Gf to obtain an inverse value of the set point for the braking torque Cfr to generate a positive set point for the braking torque Cfr if the speed error ϵ is negative and a null set point for the braking torque Cfr if the speed error ϵ is positive. The set point for the acceleration torque Car is set to zero so as not to demand torque from the engine unnecessarily during braking.

The step 194 or 195 that is activated then loops to the step 191 to generate the necessary torque set point as a function of the error ϵ in respect of the measured speed vm relative to the automatic set point for the speed vr given by one of the steps 181, 182.

The invention claimed is:

1. A method for automatically controlling a motor vehicle when the motor vehicle is automatically operated, the method comprising:
receiving, using a microprocessor, data corresponding to a reference local trajectory and a potential speed of the motor vehicle;
calculating, using the microprocessor, a turning angle automatic set point that causes the motor vehicle to describe a circular arc including a point of intersection with said reference local trajectory at a distance from the motor vehicle, including calculating a lateral acceleration proportional to the square of the potential speed of the motor vehicle describing said circular arc;
comparing, using the microprocessor, said calculated lateral acceleration with a maximum permissible lateral acceleration value;
generating, using the microprocessor, a speed set point set to a value equal to that of the potential speed when said lateral acceleration has a value lower than said maximum permissible lateral acceleration value; and
using the microprocessor, adjusting, including reducing the value of the potential speed when said lateral acceleration has a value greater than or equal to said maximum permissible lateral acceleration value so as to calculate a reduced lateral acceleration by reiteration of the said calculating the turning angle.

2. The automatic control method as claimed in claim 1, wherein, in said calculating the turning angle, the distance that separates the motor vehicle from said point of intersection with the trajectory is calculated proportionately to the potential speed of the motor vehicle.

3. The automatic control method as claimed in claim 1, wherein the distance that separates the motor vehicle from said point of intersection with the trajectory is calculated in said calculating the turning angle by multiplying the potential speed of the motor vehicle by a variable coefficient increasing when said lateral acceleration has a value greater than or equal to said maximum permissible lateral acceleration value and the absolute value of a distance between said circular arc and the reference local trajectory is less than a maximum permissible distance.

4. The automatic control method as claimed in claim 3, wherein said distance is calculated as equal to the greatest of the measurable distances between a point of the circular arc and a point of the trajectory both located on the same radius of the circular arc.

5. The automatic control method as claimed in claim 4, wherein said maximum permissible distance is calculated equal to an overevaluation of the absolute value of the distance calculated in a previous execution of said calculating the turning angle.

6. The automatic control method as claimed in claim 1, further comprising:
generating, using the microprocessor, a speed set point set to a value equal to that of the potential speed before reduction when the value of the potential speed after reduction is less than a minimum permissible potential speed value.

7. A non-transitory computer readable medium storing program code instructions that, when executed by one or more computers, causes the one or more computers to execute the method as claimed in claim 1.

8. A device for automatically controlling an automatically operated motor vehicle, comprising:
circuitry configured to receive as input a reference local trajectory descriptor, said circuitry holding in memory a non-transitory computer readable medium as claimed in claim 7 for generating a turning angle automatic set point so as to maintain a calculated lateral acceleration short of a maximum permissible lateral acceleration value.

9. The automatic control device as claimed in claim 8, wherein the device receives as input measured speed feedback so as to generate a braking and/or acceleration torque automatic set point to maintain said lateral acceleration short of a maximum permissible lateral acceleration value.

10. A motor vehicle comprising an automatic control device as claimed in claim 8 in order to operate in an autonomous mode.

\* \* \* \* \*